UNITED STATES PATENT OFFICE.

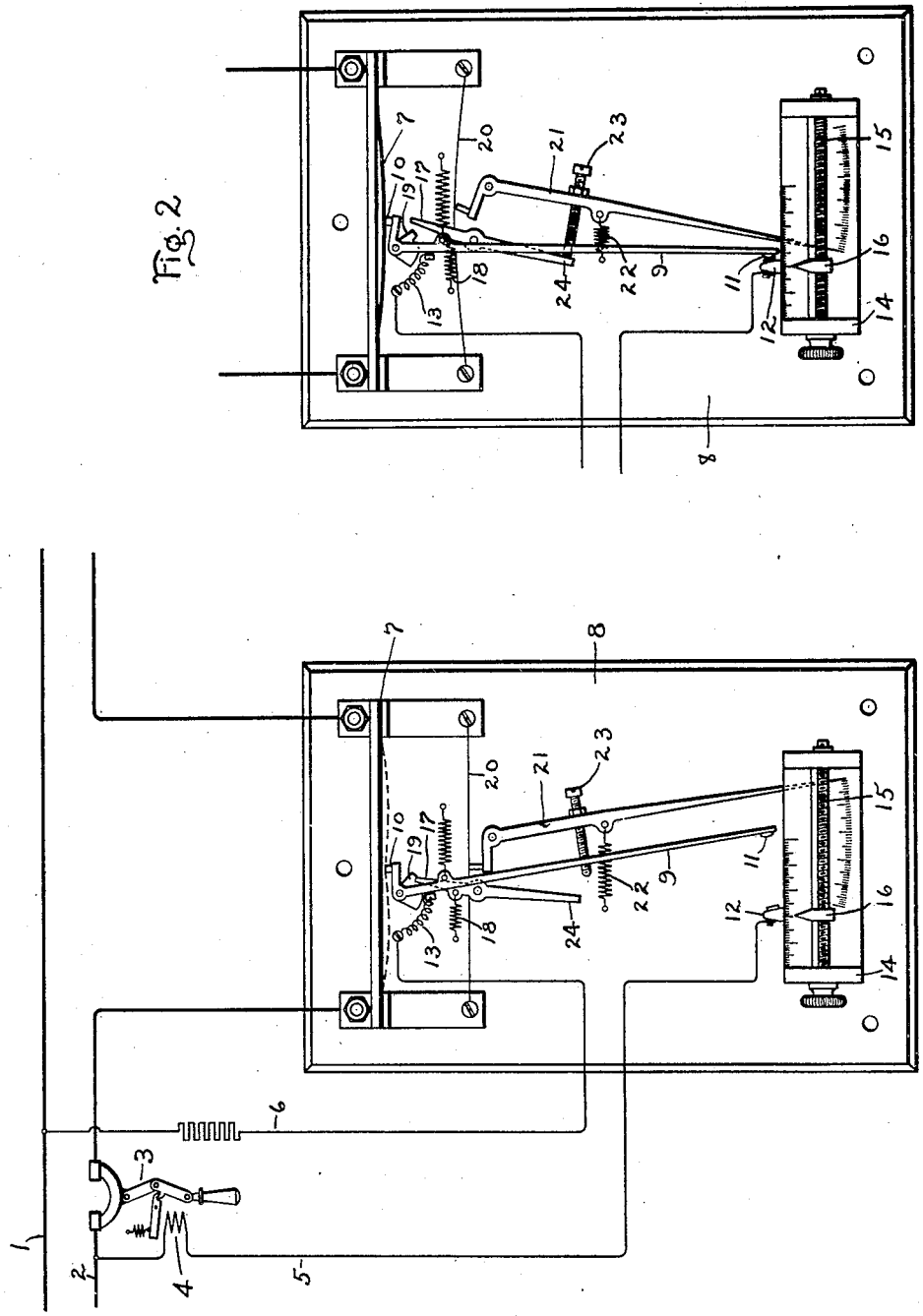

WILHELM FELLENBERG, OF CHARLOTTENBURG, GERMANY, ASSIGNOR TO GENERAL ELECTRIC COMPANY, A CORPORATION OF NEW YORK.

TIME-LIMIT CIRCUIT-BREAKER.

No. 920,045.

Specification of Letters Patent.

Patented April 27, 1909.

Application filed August 29, 1907. Serial No. 390,605.

*To all whom it may concern:*

Be it known that I, WILHELM FELLENBERG, a subject of the King of Prussia, residing at Knesebeckstrasse 68/69, Charlottenburg, Germany, have invented certain new and useful Improvements in Time-Limit Circuit-Breakers, of which the following is a specification.

My invention relates to automatic circuit breakers, and more particularly to circuit breakers which open only after an abnormal current has persisted for a predetermined length of time.

Time limit devices which secure a time lag by the use of a thermostatic device such as a hot wire or expansion bar heated by the flow of current are very simple and effective and have the advantage that they are affected only by the amount of current which flows through them regardless of its frequency or wave form. One disadvantage is that a breaker controlled by a thermostatic time limit device cannot be reset while the device is hot, and another arises from the fact that a flow of current through an expansion bar causes it to elongate at a constantly decreasing rate, so that while the greater part of the elongation takes place in a comparatively short period of time, the bar does not reach its maximum elongation until after a very considerable period of time has elapsed. Thermostatic trip mechanisms can therefore be used only where the circuit breaker trips on an overload considerably greater than normal, since if an expansion bar is designed to expand enough to trip the circuit breaker within a reasonable time limit at a current five or ten per cent greater than normal, it will very gradually expand at normal current until eventually it will trip the circuit breaker although the current is only normal. Another disadvantage of a single expansion bar used for a time limit trip device for circuit breakers is that the amount of current flowing through the bar cannot be changed without changing the time lag of the device, and it is often desirable to alter the amount of current to which the device will respond without altering the time limit.

The object of my invention is to provide a simple thermostatic time limit device for circuit breakers which will permit the breaker to be reset immediately after having been tripped, in which the amount of current required to operate the device and the time limit of operation may be independently varied; and in which the difficulties and disadvantages heretofore encountered in using hot wires or other thermal expansion devices are avoided.

In carrying out my invention I provide an actuating means for the circuit controller, which is preferably a hot wire, an expansion bar or any equivalent arrangement requiring a predetermined time to move to a position in which it can operate the controller, and a restraining means or detent to maintain the actuating means in an inoperative position unless a variation of current of predetermined amount takes place, whereupon the detent instantly leaves the actuating means free to actuate the controller if the variation of current persists for a sufficient length of time. As soon as the current returns to normal the detent returns to position to maintain the actuating means inoperative, so that when the current becomes normal the controller can be reset and will be held closed regardless of the temperature of the expansion bar which actuates the controller. A gradual elongation of the expansion bar due to a continued flow of current less than that for which the device is set cannot trip the controller since the expansion bar is unable to affect the controller until released by the restraining means as a result of abnormal current.

My invention will best be understood in connection with the accompanying drawings which illustrate one embodiment of my invention and in which—

Figure 1 is a view of a device embodying my invention applied to a circuit breaker, the parts being shown in the position assumed by them when normal current is flowing, and Fig. 2 a view of the same device with the parts in the position assumed by them to trip the circuit breaker.

In the arrangement shown in the drawings, the circuit to be controlled comprises leads 1 and 2, one of which is connected to a circuit breaker 3 by means of which the circuit may be opened when desired. The circuit breaker is provided with a tripping coil 4 which may be energized from the main circuit through leads 5 and 6 and when energized trips the circuit breaker and thereby opens the main circuit.

The arrangement shown in the drawings for securing a time limit comprises an expansion bar or hot wire 7 connected in series with the lead 2 of the main circuit, and so proportioned that it will require a predetermined time to respond to a predetermined excess of current and move from an inoperative position to an operative position. The expansion bar is rigidly supported at each end in any suitable way upon a base plate 8, upon which is pivotally mounted a tripping means or contact-making arm 9 in the form of a bell-crank lever having a short arm provided with a projection 10 in engagement with the middle of the expansion bar 7, and a long arm carrying a contact 11 for closing the circuit through the trip coil 4 by coöperating with an adjustable contact 12 connected to the lead 5. When the expansion bar 7 moves the tripping means or arm 9 to operative position and brings the contacts 11 and 12 into engagement, the circuit through the tripping coil 4 is closed, since the lead 6 is connected to the contact-making arm 9 through a flexible coil 13, and the circuit breaker is tripped. The contact 12 is adjustably mounted in a support 14, and its position is controlled by an adjusting screw 15 mounted in said support. The position of the contact 12 is indicated by a pointer 16 carried thereby and coöperating with a scale on the support 14. The time lag or period of time which elapses from the occurrence of an abnormal current and the beginning of the heating of the strip 7 until the contacts 11 and 12 engage and the circuit breaker 3 is tripped is varied by changing the position of the contact 12.

So far as described the device is an ordinary tripping mechanism having a single hot wire and with the disadvantages inherent in such a device. In order to overcome those disadvantages I mount upon the base 8 a restraining means for the tripping mechanism of any suitable type, and shown as a pivoted detent 17 with one end normally held in position by a spring 18 to engage a notch in a locking member 19 rigidly connected to the tripping means or contact-making arm 9 and thereby hold said arm in the inoperative position shown in Fig. 1. When the detent is in engagement with the member 19 the actuation of the contact-making arm 9 and therefore the tripping of the circuit breaker 4 is prevented, since the contact-making arm is held stationary regardless of the temperature of the expansion strip 7 and if the expansion strip becomes heated under such conditions it can assume the form shown by the dotted line in Fig. 1, but without moving the arm 9 to operative position. The restraining means or detent 17 is controlled by any device which will respond instantly to variations of current in the main circuit, and the arrangement which I prefer comprises a hot wire 20 of such a size that it responds practically instantaneously to changes in current. This wire is stretched between two rigid supports on the base 8 and at the middle is engaged by the short arm of a bell-crank controlling lever 21 pivotally mounted on the base 8 and compelled to remain in engagement with the wire 20 by a spring 22. It may be placed in shunt to bar 7 so as to carry a small fractional part of the current. The controlling arm affects the restraining means or detent 17 through an adjustable set-screw 23 so mounted on the controlling arm that it will engage the end 24 of the detent 17 when the current in the main circuit reaches a predetermined amount and move the detent to release the contact-making arm 9. By varying the adjustment of the set-screw 23 the amount of current which must flow in the main circuit before the detent is actuated may be varied, and this adjustment does not affect in any way the time limit of the device, which is determined by the position of the contact 12 with relation to the contact 11. If desired the end of the controlling arm 21 may be formed as a pointer to coöperate with a scale on the support 14 to indicate the amount of current flowing in the circuit.

The operation of the device is as follows: When the current in the main circuit is normal the parts are in the position shown in Fig. 1, and any slight variations in temperature of the expansion bar 7 has no effect on the contact-making arm because that arm is positively restrained by the latch 17. Moreover the bar 7 is relatively to the wire, so very thick, that it will expand slowly or with a time interval. If an abnormal current flows in the main circuit, the wire 20 instantly expands and sags down to the position shown in Fig. 2, in which position the set-screw 23 engages the end 24 of the detent 17, moving the detent out of engagement with the member 19 and leaving the contact-making arm 9 free to respond to movement of the expansion bar 7. As the abnormal current continues, the expansion bar bows up into the form shown in Fig. 2 moving the arm 9 toward operative position, and eventually the contacts 11 and 12 engage, completing the circuit through the trip coil 4 and breaking the main circuit by opening the circuit breaker 3. If the current returns to normal before the contacts 11 and 12 have come into engagement, the controlling arm 21 moves back to the position shown in Fig. 1 and the detent 17 is held by its spring 18 in a position to catch and engage the member 19 as soon as the contact-making arm is returned to normal position by the cooling down of the expansion bar. When the circuit breaker is tripped, the current in the main circuit ceases and the hot wire 20 immediately returns to its normal position shown in Fig. 1, bringing the detent 17 into position to catch and firmly hold the contact arm 9 as soon as it is brought back to its normal position, so that all that is necessary to reset the circuit breaker 3 immediately is to forcibly return the contact-making arm 9 to its position against the force exerted by the hot expansion strip 7, whereupon the contact-making arm will be caught by the detent 17 and positively held in the inoperative position shown in Fig. 1, regardless of the temperature of the strip 7, unless another abnormal flow of current affects the wire 20 and thereby causes the detent 17 to release the contact-making arm 19.

My invention may be embodied in many other forms than that shown and described, and other equivalent devices may be substituted for the hot wire. I therefore do not wish to be restricted to the precise form shown but intend to cover by the appended claims all changes and modifications within the spirit and scope of my invention.

What I claim as new and desire to secure by Letters Patent of the United States, is,—

1. The combination with a current controlling device, of actuating mechanism responsive with a time lag to variations of current for affecting said device to control the circuit, a detent engaging said actuating mechanism to render it inoperative when the current is normal and means responsive to abnormal current for moving the detent to release said mechanism.

2. The combination with a circuit breaker, of a thermostatic device of large current carrying capacity for actuating the tripping mechanism of said breaker, and a second thermostatic device of small capacity and quick to cool for controlling the tripping action of said first device.

3. The combination with a circuit breaker, of a thermostatic strip of large section for actuating the tripping mechanism of said breaker, and a second thermostatic strip of small section for controlling the tripping action of said first strip.

4. The combination with a current controlling device of a thermostatic actuating mechanism responsive to current for affecting said controlling device and movable to inoperative position while hot, a detent for locking said device in inoperative position, and means responsive to current for controlling the detent.

5. The combination with a current controlling device of a thermostatic actuating mechanism responsive to current for affecting said controlling device and movable to inoperative position while hot, a detent for locking said device in inoperative position, and means for holding the detent out of locking position while an abnormal current is flowing.

6. In a circuit controller, the combination with tripping means for the controller, of a thermostatic device slowly responsive to current in the circuit for operating said tripping means, a detent for holding the trip in inoperative position, and a second thermostatic device quickly responsive to current in the circuit for controlling said detent.

7. In a circuit controller, the combination with tripping means for the controller, of a thermostatic device slowly responsive to current in the circuit for operating said tripping means and movable to inoperative position while hot, a detent for holding said device in inoperative position, and a second thermostatic device quickly responsive to current in the circuit for controlling said detent.

8. In a circuit controller, the combination with tripping means for the controller, of a thick expansion strip connected in the circuit with a free portion in engagement with the tripping means to actuate the same, a detent for holding said strip in inoperative position, and a thin expansion strip connected in the circuit for moving the detent to release the thick strip when an abnormal current flows in the circuit.

9. In a circuit controller, the combination with tripping means for the controller slowly responsive to abnormal current, of a detent for positively holding said tripping means in inoperative position, controlling means quickly responsive to variations of current for moving the detent to release the tripping means, and adjustable means for varying the relation of said controlling means to the detent.

10. In a circuit controller, the combination with tripping means slowly responsive to abnormal current, of a detent for positively holding said tripping means in inoperative position, controlling means quickly responsive to variations in current, and an adjustable stop carried by said controlling means for engaging the detent to move it to release the tripping means.

In witness whereof, I have hereunto set my hand this sixth day of August 1907.

WILHELM FELLENBERG.

Witnesses:
JULIUS RUMLAND,
ALFRED WOLF.